United States Patent
Chami et al.

(10) Patent No.: US 11,603,150 B2
(45) Date of Patent: Mar. 14, 2023

(54) METHOD AND SYSTEM FOR FIXTURELESS ASSEMBLY OF A VEHICLE PLATFORM

(71) Applicant: Ford Global Technologies, LLC, Dearborn, MI (US)

(72) Inventors: Hussein Chami, Dearborn, MI (US); Robert Alan Jones, Ypsilanti, MI (US); Alexander Marrocco, Windsor (CA); Francis Maslar, Grosse Ile, MI (US); Arnon Wexler, Bloomfield Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 12 days.

(21) Appl. No.: 17/357,592

(22) Filed: Jun. 24, 2021

(65) Prior Publication Data
US 2022/0410995 A1 Dec. 29, 2022

(51) Int. Cl.
| | |
|---|---|
| *B25J 13/08* | (2006.01) |
| *B62D 65/02* | (2006.01) |
| *B21D 53/88* | (2006.01) |
| *G05B 19/00* | (2006.01) |
| *B25J 9/00* | (2006.01) |

(52) U.S. Cl.
CPC ........... *B62D 65/024* (2013.01); *B21D 53/88* (2013.01); *B25J 9/0084* (2013.01); *G05B 19/00* (2013.01)

(58) Field of Classification Search
CPC ...... B25J 9/1633; B25J 9/1694; B25J 9/1697; B25J 9/1687; B25J 9/023; B25J 13/085; B25J 13/089; G05B 19/418; G05B 229/39319; G05B 229/33039
USPC .... 700/245, 258, 261, 114, 259, 260; 901/1, 901/2, 46
See application file for complete search history.

(56) References Cited

U.S. PATENT DOCUMENTS

| | | | |
|---|---|---|---|
| 9,785,610 B1 * | 10/2017 | Larson | B60C 25/132 |
| 10,095,214 B2 * | 10/2018 | Ghanem | G01B 11/00 |
| 10,712,730 B2 * | 7/2020 | Borowicz | G05B 19/41805 |
| 2006/0142657 A1 * | 6/2006 | Quaid | A61B 17/1703 600/424 |
| 2015/0336271 A1 | 11/2015 | Spicer et al. | |
| 2015/0343640 A1 * | 12/2015 | Shi | B25J 9/1687 382/153 |
| 2020/0130189 A1 | 4/2020 | Ghanem | |
| 2020/0262078 A1 | 8/2020 | Saez et al. | |
| 2020/0262079 A1 | 8/2020 | Saez et al. | |
| 2022/0089237 A1 * | 3/2022 | Sverdlov | G05B 19/41895 |

* cited by examiner

*Primary Examiner* — Dalena Tran
(74) *Attorney, Agent, or Firm* — Burris Law, PLLC

(57) ABSTRACT

A system for assembling a vehicle platform includes a robotic assembly system having at least two robotic arms, a vision system capturing images of an assembly frame, and a control system configured to control the robotic assembly system to assemble the vehicle platform based on images from the vision system, force feedback from the at least two robotic arms, and a component location model. The control system is further configured to identify assembly features of a first component and a second component of the vehicle platform from the images, operate the robotic arms to orient the first component and the second component to respective nominal positions based on the images and the component location model, and operate the robotic arms to assemble the first component to the second component based on the force feedback.

20 Claims, 5 Drawing Sheets

METHOD AND SYSTEM FOR FIXTURELESS ASSEMBLY OF A VEHICLE PLATFORM

FIELD

The present disclosure relates to a method and system for assembling a vehicle platform.

BACKGROUND

The statements in this section merely provide background information related to the present disclosure and may not constitute prior art.

In manufacturing a modular vehicular platform having multiple components, it is common practice to employ alignment tools to control the position of the components during assembly. For example, rigid fixtures are typically used to align and assemble specific components of the vehicle platform. In some applications, multiple fixtures are employed in order to manufacture a single vehicle platform. In addition, such rigid fixtures are typically not adaptable for different sized and/or shaped vehicle platforms, thereby requiring separate sets of fixtures for varying vehicle platforms.

These and other issues related to assembling modular vehicle platforms are addressed by the present disclosure.

SUMMARY

This section provides a general summary of the disclosure and is not a comprehensive disclosure of its full scope or all of its features.

In one form, the present disclosure is directed to a system for assembling a vehicle platform. The system includes a robotic assembly system, a vision system, and a control system. The robotic assembly system includes at least two robotic arms operable to locate components of the vehicle platform. Each of the at least two robotic arms includes an end-effector and a force sensor configured to provide force feedback. The at least two robotic arms includes a first robotic arm configured to locate a first component and a second robotic arm configured to locate the second component. The components of the vehicle platform include the first component and the second component. The vision system includes one or more multidimensional imaging devices configured to capture images of one or more assembly frames at which the components of the vehicle platform are to be located. The control system is configured to control the robotic assembly system to assemble the vehicle platform based on the images from the vision system, the force feedback from the at least two robotic arms, and a component location model. The control system includes a processor and a nontransitory computer-readable medium storing instructions that are executable by the processor. The instructions include identifying one or more assembly features of the first component and the second component from the images from the vision system, operating the first robotic arm and the second robotic arm to orient the first component and the second component to respective nominal positions, respectively, based on the images from the vision system and the component location model, and operating the first robotic arm and the second robotic arm to assemble the first component to the second component based on the force feedback.

In some variations, the component location model is a trained model configured to provide desired robotic arm positions for the first robotic arm and the second robotic arm based on current positions of the components.

In some variations, to assemble the first component to the second component, the instructions of the control system further include determining whether the force feedback from the force sensors is above a defined setpoint, and instructing the robotic assembly system to end assembly of the first component and the second component in response to the force feedback being above the defined setpoint.

In some variations, at least one of the one or more multidimensional imaging devices of the vision system is secured to the robotic assembly system.

In some variations, at least one of the one or more multidimensional imaging devices of the vision system is external to the robotic assembly system.

In some variations, to orient the first component and the second component to the respective nominal positions, the instructions of the control system further include determining current positions of the first component and the second component based on the assembly features identified in the images, calculating, by the component location model, positional offsets for the first component and the second component based on the current positions and the nominal positions, and operating the first robotic arm and the second robotic arm based on the positional offsets to provide the first component and the second component at respective nominal position.

In some variations, the one or more imagining devices are configured to associate the images of the one or more assembly frames to a vision system coordinate system, and the instructions of the control system further includes converting the images of the one or more assembly frames from the vision system coordinate system to a robotic coordinate system associated with the robotic assembly system.

In some variations, the system further includes a robotic joining system configured to fixedly secure the first component to the second component as part of a securing process. The instructions of the control system further include operating the robotic joining system to fixedly secure the first component and the second component that are assembled.

In some variations, the robotic joining system includes one or more end-effector tools configured to fixedly secure the first component to the second component via welding, adhesive bonding, mechanical fastening or a combination thereof.

In some variations, the robotic assembly system is configured to control position of the first component and the second component during the securing process by the robotic joining system.

In one form, the present disclosure is directed to a method of assembling a vehicle platform. The method includes locating, by a robotic assembly system, a first component and a second component of the vehicle platform, where the robotic assembly system includes at least two robotic arms, each of the at least two robotic arms includes an end-effector and a force sensor configured to provide force feedback, and the at least two robotic arms includes a first robotic arm configured to locate the first component and a second robotic arm configured to locate the second component. The method further includes capturing, by a vision system, images of one or more assembly frames at which the first component and the second component of the vehicle platform are to be located, where the vision system includes one or more multidimensional imaging devices. The method further includes identifying, by a control system, one or more assembly features of the first component and the second component from the images from the vision system, operating, by the control system, the first robotic arm and the second robotic arm to orient the first component and the second component to respective nominal positions based on the images from the vision system and a component location model, and operating, by the control system, the first robotic arm and the second robotic arm to assemble the first component to the second component based on the force feedback from the force sensors.

In some variations, the component location model is a trained model configured to provide desired robotic arm positions for the first robotic arm and the second robotic arm based on current positions of the first component and the second component, respectively.

In some variations, to assemble the first component to the second component, the method further includes determining, by the control system, whether the force feedback is above a defined setpoint, and instructing, by the control system, the robotic assembly system to end assembly of the first component to the second component in response to the force feedback being above the defined setpoint.

In some variations, to orient the first component and the second component to the respective nominal positions, the method further includes determining, by the control system, current positions of the first and the second component based on the assembly features identified from the images, calculating, by the control system via the component location model, positional offsets for the first component and the second component based on the current positions and the nominal positions, and operating, by the control system, the first robotic arm and the second robotic arm based on the positional offsets to provide the first component and the second component at respective nominal position.

In some variations, the method further includes associating, by the vision system, the images of the one or more assembly frames to a vision system coordinate system, and converting, by the control system, the images of the one or more assembly frames from the vision system coordinate system to a robotic coordinate system associated with the robotic assembly system.

In some variations, the method further includes operating, by the control system, a robotic joining system to fixedly secure the first component and the second component that are assembled during a securing process.

In some variations, the robotic joining system includes one or more end-effector tools configured to fixedly secure the first component to the second component via welding, adhesive bonding, mechanical fastening or a combination thereof.

In some variations, the method further includes controlling, by the robotic assembly system, position of the first component and the second component during the securing process by the robotic joining system.

In one form, the present disclosure is directed to a system for assembling a vehicle platform. The system includes a robotic assembly system, a vision system, and a control system. The robotic assembly system includes at least two robotic arms operable to locate components of the vehicle platform, where each of the at least two robotic arms includes an end-effector and a force sensor configured to provide force feedback. The at least two robotic arms includes a first robotic arm configured to locate a first component and a second robotic arm configured to locate the second component, wherein the components of the vehicle platform include the first component and the second component. The vision system includes one or more multidimensional imaging devices configured to capture images of one or more assembly frames at which the components of the vehicle platform are to be located. The control system is configured to control the robotic assembly system to assemble the vehicle platform based on the images from the vision system, the force feedback from the at least two robotic arms, and a component location model. The control system includes a processor and a nontransitory computer-readable medium storing instructions that are executable by the processor, and the instructions include identifying the assembly features of the first component and the second from the images from the vision system, determining current positions of the first component and the second component based on the assembly features identified, calculating, by the component location model, positional offsets for the first component and the second component based on the current positions and nominal positions for the first component and the second component, operating the first robotic arm and the second robotic arm based on the positional offsets to provide the first component and the second component at respective nominal position, operating the first robotic arm and the second robotic arm to assemble the first component to the second component based on the force feedback, determining whether the force feedback from the force sensors is above a defined setpoint, and instructing the robotic assembly system to end assembly of the first component and the second component in response to the force feedback being above the defined setpoint.

In some variations, the system further includes a robotic joining system configured to fixedly secure the first component to the second component as part of a securing process, where the instructions of the control system further include operating the robotic joining system to fixedly secure the first component to the second component that are assembled.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 4:
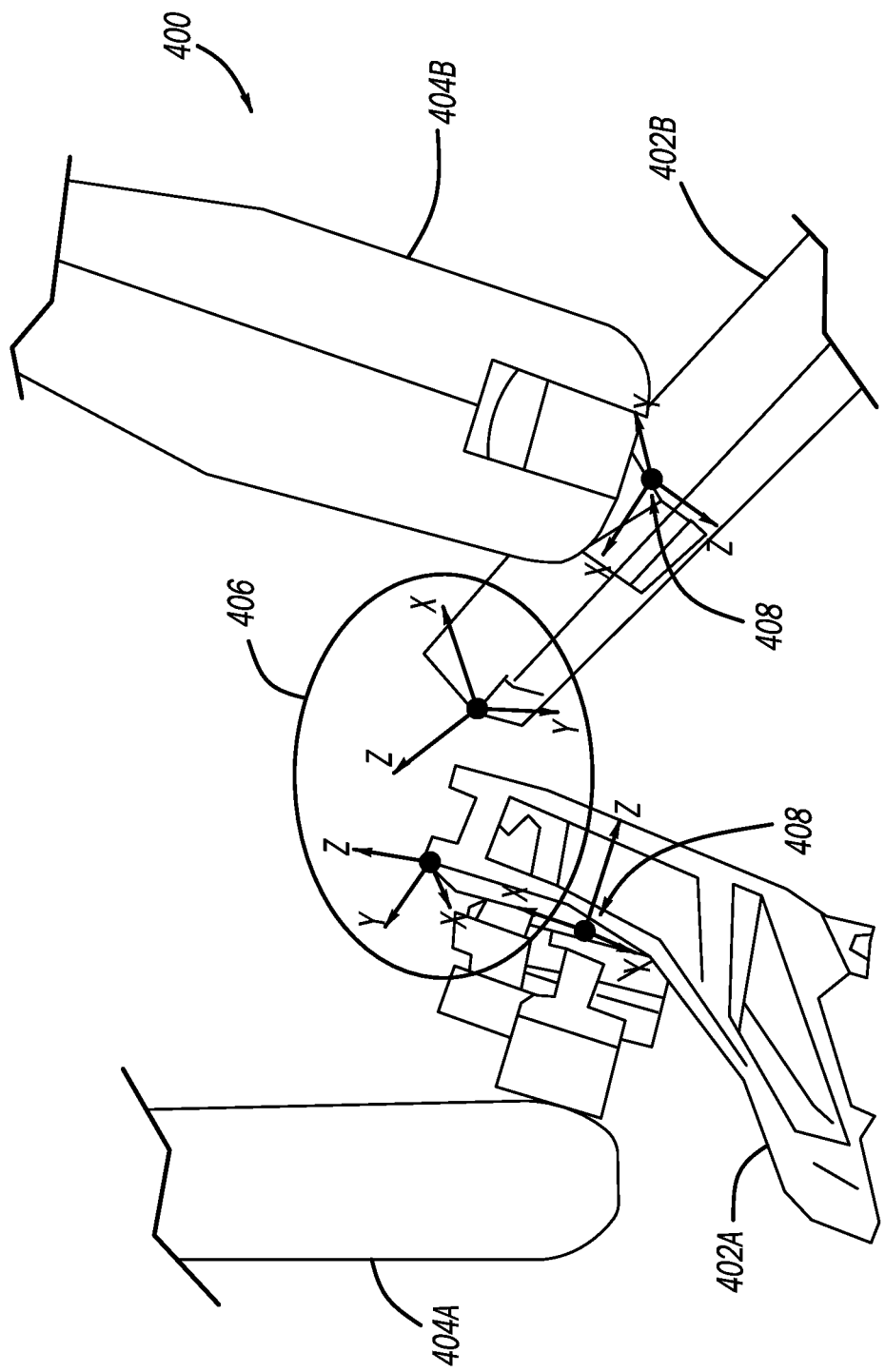
Figure 5:
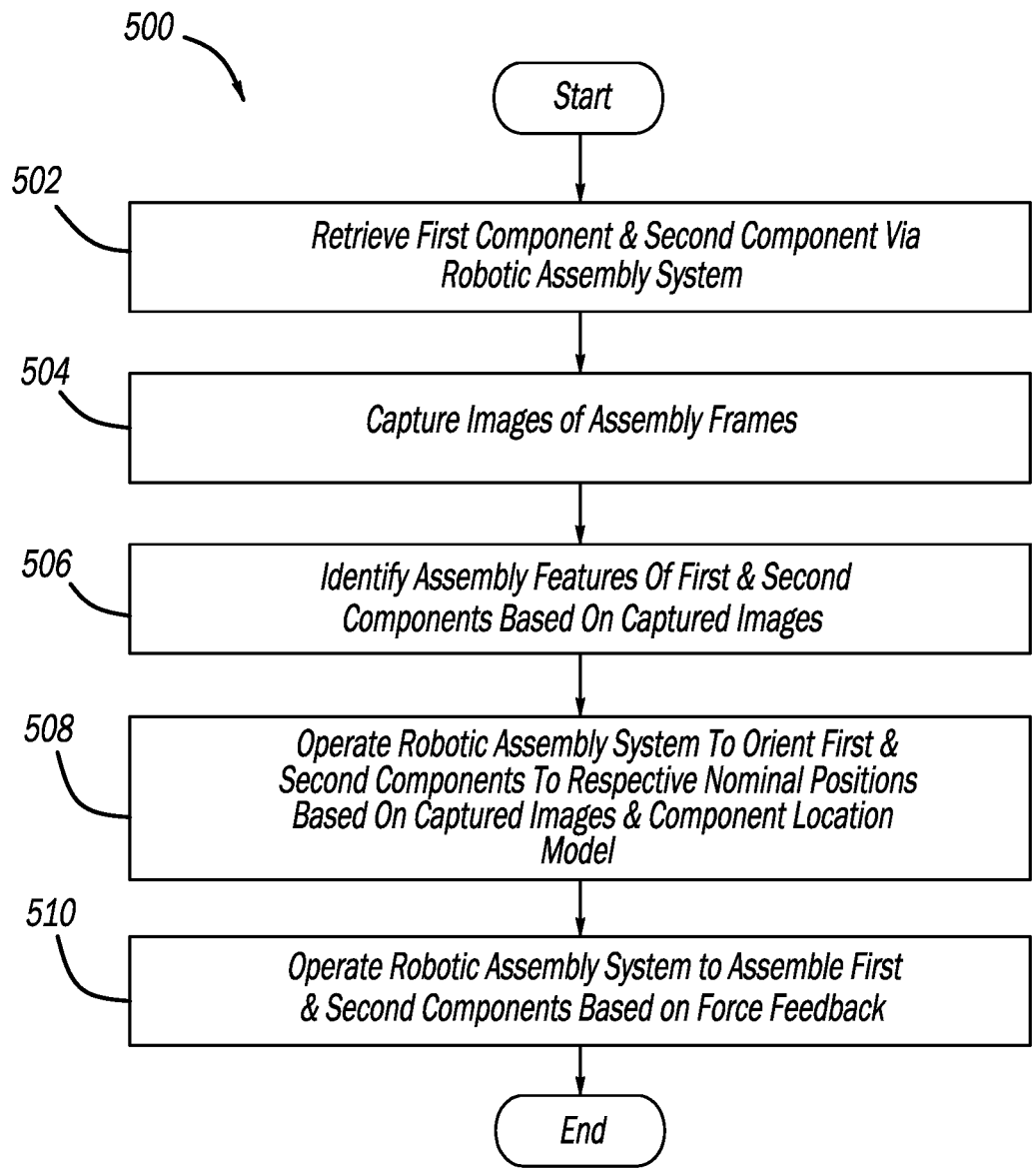

FIG. 4 a perspective view of robotic arms handling components of the vehicle platform and a coordinate conversion in accordance with the present disclosure; and FIG. 5 is a flowchart of an assembly routine in accordance with the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Generally, the present disclosure provides a fixtureless assembly system that is configured to assemble a modular vehicle platform using a component location model to orient components of the vehicle platform, and force feedback control to join the components.

Figure 1:
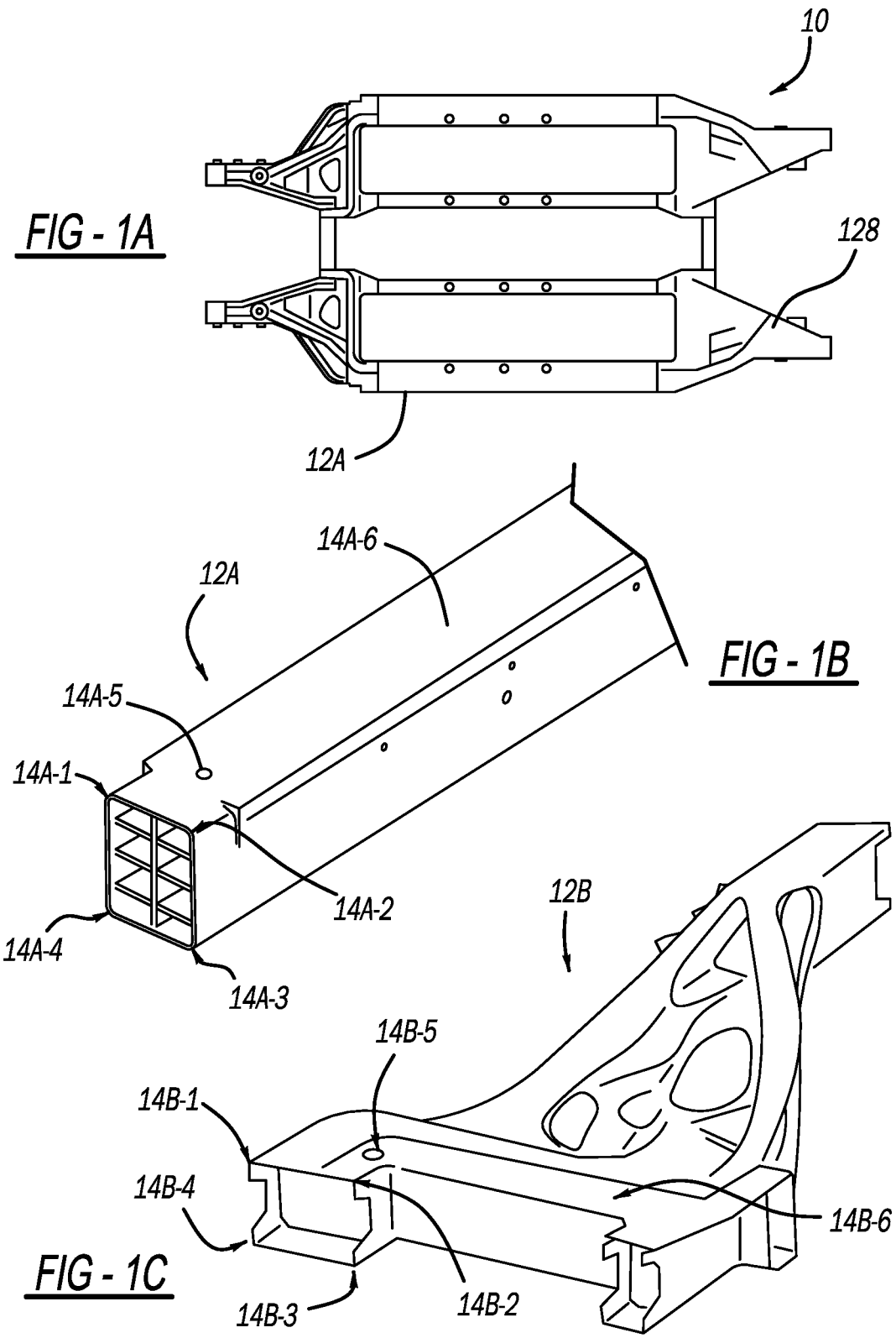
FIG. 1A is a perspective view of a vehicle platform in accordance with the present disclosure.
FIGS. 1B and 1C illustrate components of the vehicle platform of FIG. 1A.

Referring to FIGS. 1A to 1C, in an example application, a vehicle platform 10 includes a plurality of components such as a rail 12A and a node 12B (collectively "components 12"). In one form, each of the components 12 includes assembly features which are used to determine a position of the components (e.g., position along x, y, z axes and/or rotational position about yaw, pitch, roll axes). Assembly features can include, but are not limited to datums, assembly interface points, and/or structural features. For example, the rail 12A includes interface points 14A-1, 14A-2, 14A-3, and 14A-4, an opening 14A-5 (i.e., structural feature), and a datum surface 14A-6 (collectively "rail assembly features 14A"). The node 12B includes interface points 14B-1, 14B-2, 14B-3, and 14B-4, an opening 14B-5, and a datum surface 14B-6 (collectively "node assembly features 14B").

As used herein, the term "structural" should not be construed to limit the component as being a load-bearing component, or a load-bearing component configured to transfer structural loads to an adjacent, attached component. Further, a "node" should be construed to mean one or more features of a component that is configured to mate with an adjacent component in a modular fashion.

As described herein, the fixture assembly system of the present disclosure employs a vision system for capturing images of the components, and a control system for identifying the assembly features and controlling a robotic assembly system for locating the components to desired positions and assembling the components. Accordingly, with respect to components such as the rail 12A and the node 12B, the fixtureless assembly system is configured to assemble the vehicle platform 10 without the use of rigid fixtures or other fixed alignment tools. In addition, the fixtureless assembly system 100 is adaptable to assemble different types of vehicle platforms, thereby providing a dynamic assembly system. For example, the fixtureless assembly system 100 could assemble components for a Ford Bronco during one period of time, then assemble components for a Ford Mach-E for another period of time, and then assemble components for a Ford F-150 for another period of time. It should be understood that these vehicle platforms are merely exemplary and should not be construed as limiting the scope of the present disclosure.

Figure 2:
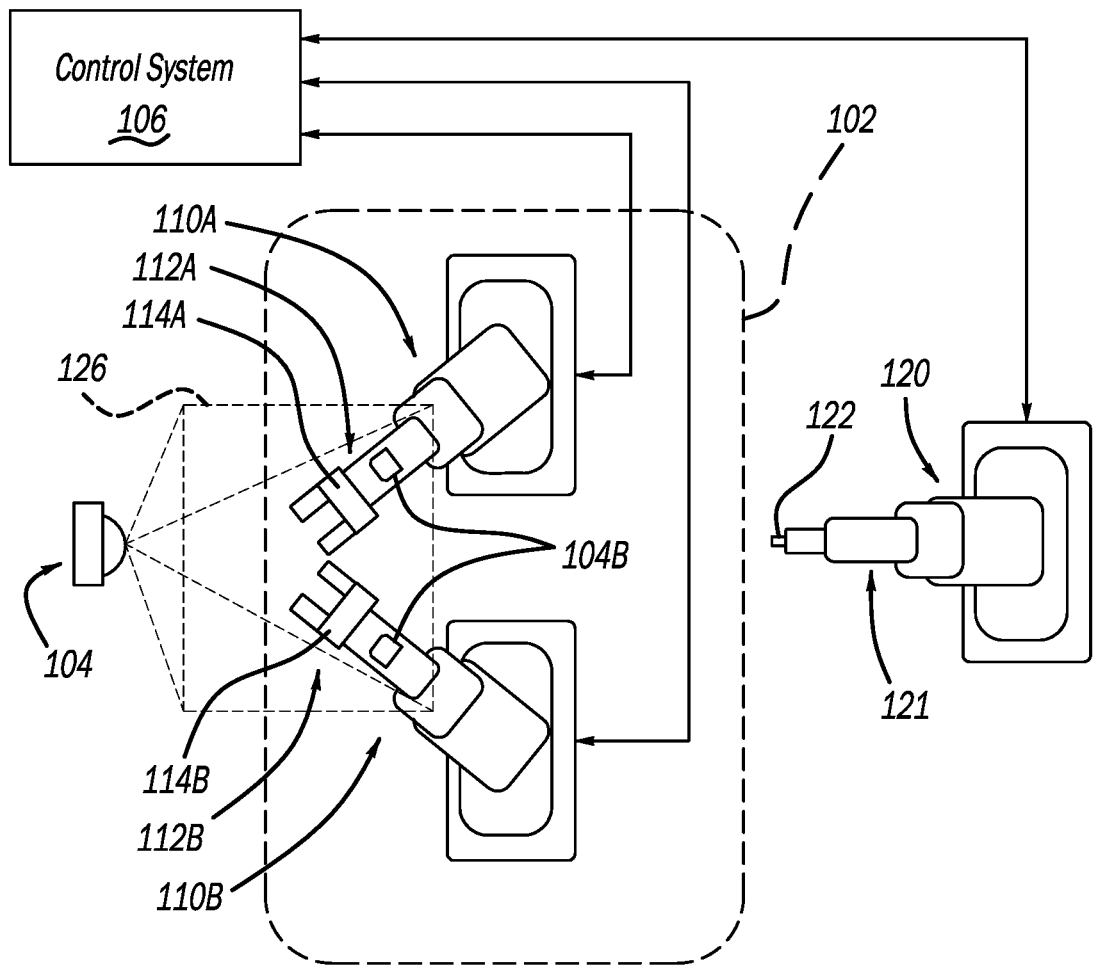
FIG. 2 illustrates a fixtureless assembly system for assembling a vehicle platform in accordance with the present disclosure.
Figure 3:
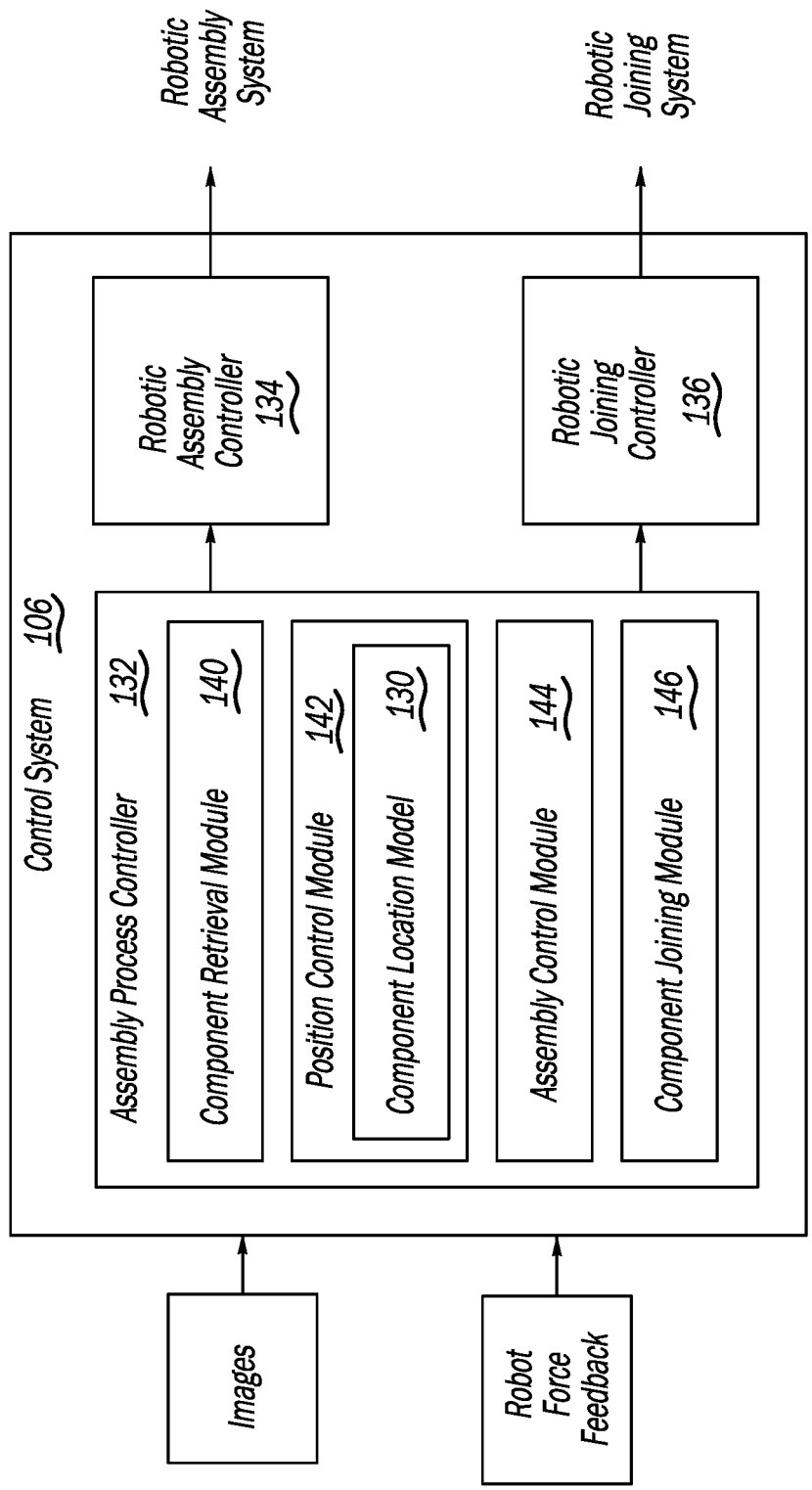
FIG. 3 is a block diagram of a control system of the fixtureless assembly system in accordance with the present disclosure.

Referring to FIGS. 2 and 3, in one form, a fixtureless assembly system 100 of the present disclosure includes a robotic assembly system 102, one or more multidimensional imaging devices 104A, 104B, and a control system 106 to control the robotic assembly system 102.

In one form, the robotic assembly system 102 includes at least two robotic arms, to locate the components. For example, in FIG. 2, the robotic assembly 102 includes robotic arms 110A and 110B (collectively "robotic arms 110") provided as multi-axial industrial robotic arms. The robotic arms 110 includes end-effectors 112A and 112B (collectively "end-effectors 112") and integrated force sensors 114A and 114B (collectively "force sensors 114"), such as load cells, configured to provide force feedback. In one form, the force sensors 114 are configured to detect a force and torque having multiple degree of freedom (e.g., 6-degrees freedom), and output the detected force and torque as a signal (e.g., analog signal and/or digital signal) to the control system 106 for further analysis. As used herein, the term locate includes obtaining/grasping, moving, and/or holding the components.

In the example application provided, the robotic arm 112A, as a first robotic arm, is configured to locate a first component and the robotic arm 112B, as a second robotic arm, is configured to locate a second component different from the first component. Together the robotic arms 110 are controlled to assemble the first component to the second component. While the robotic arms 110 are provided on two separate robots, other types of robots having a robotic arm, or robotic arms, may be employed, such as a single robot having two or more independently controlled robotic arms.

In one form, in addition to the robotic assembly system 102, the fixtureless assembly system 100 further includes a robotic joining system 120 configured to fixedly secure the components as part of a joining process. In one form, the robotic joining system 120 includes a robotic tool arm 121 and one or more end-effector tools 122. In one form, the end-effector tool(s) 122 is configured to fixedly secure the components via, for example, welding, adhesive bonding, mechanical fastening or a combination thereof. In an example application, during the securing process, the robotic assembly system 102 is operable to control the position of the first component and the second component as the end-effector tool(s) 122 is moved via the robotic tool arm 121 along an interface of the assembled first component and the second component to join the components together.

The multidimensional imaging devices 104A, 104B form a vision system for the assembly process. In one form, the imaging devices 104A, 104B includes an overhead imaging device 104A and robot central imaging device 104B (collectively "imaging devices 104" or "vision system 104") provided at the robotic arms 110. The multidimensional imaging devices 104 are configured to capture images of one or more assembly frames 126 at which the components are to be located and are within a field of view of the imaging devices 104. The multidimensional imaging devices 104 may be provided as two-dimensional (2D) cameras, three-dimensional (3D) cameras, 2D scanners, and/or 3D scanners, among other suitable multidimensional cameras. While not illustrated in FIG. 2, the imaging devices 104 are communicably coupled to the control system 106 via wired and/or wireless communication link.

The control system 106 is configured to control the robotic assembly system 102 to assemble the components based on the images from the vision system 104, the force feedback from the at least two robotic arms 110, and a component location model 130. More particularly, in one form, the control system 106 is configured to operate the first robotic arm and the second robotic arm to retrieve and orient the first component and the second component to respective nominal positions based on the images from the vision system. The control system 106 is further configured to operate the first robotic arm and the second robotic arm to assemble the first component to the second component based on the force feedback, and is configured to operate the robotic joining system 120 to fixedly secure the assembled first component and second component.

Referring to FIG. 3, in one form, the control system 106 includes an assembly process controller 132, a robotic assembly controller 134 to control the robot assembly system 102, and a robotic joining controller 136 to control the robot joining system 120. As described herein, the assembly process controller 132 is configured to determine position of the components, assembly the components via the robot assembly system 102, and join the assembled components via the robot joining system 120.

The robotic assembly controller 134 is configured to control movement of the robotic assembly system 102 and more particularly, the robotic arms 110. For example, the robotic assembly controller 134 is configured to drive motors and/or actuators provided in the robotic arms 110 to control position of the end-effectors 112 and thus, the position of the components. More particularly, in one form, the robotic assembly controller includes software programs for having the robotic arms 110 perform one or more tasks such as retrieving components, locating components, and assembling the components.

The robotic joining controller 136 is configured to control movement of the robotic joining system 120 and the operation of the end-effector tool(s) 122 to fixedly secure assembled components. More particularly, in one form, the robotic joining controller includes 136 software programs to have the robotic joining system 120 perform one or more tasks, such as the securing process, to move the robotic tool arm 121 and more particularly, the end-effector tool 122.

In one form, the assembly process controller 132 includes a component retrieval module 140, a position control module 142 having the component location model 130, an assembly control module 144, and a component joining module 146. The component retrieval module 140 is configured to control the robotic assembly system 102 to retrieve the components to be assembled. For example, the components may be provided in a staging area that is within an operation range of the robotic arms 110 of the robotic assembly system 102. The component retrieval module 140 transmits a command to the robotic assembly controller 134 to have the robotic arms retrieve respective parts from the staging area. In some variations, the component retrieval module 140 may process images from the imaging device 104 to locate a designated assembly feature (e.g., a surface of the component) of the components and to orient the end-effectors 112 of the robotic arms 110 with the respective components. In some variations, in the event the imagining devices 104 are provided at the robotic arms 110, the robotic assembly controller 134 is configured to process the images from the imaging devices 104 at the robotic arms 110 to identify the designated assembly feature of the components and have the robotic arms 110 retrieve the components.

Once retrieved, the position control module 142 is configured to determine the position of the components, locate the components to be assembled to respective nominal positions based on the images from the visional system, and assemble the components. To determine the position of the components, the position control module 142 is configured to identify one or more assembly features of the components and determine the position of the assembly features. More particularly, the images of the assembly frames having the components are originally associated with a coordinate system associated with the vision system (i.e., vision system coordinate system). The position control module 142 is configured to convert the images from the vision system coordinate system to a coordinate system associated with the robot assembly system 102 (i.e., robotic coordinate system).

For example, referring to FIG. 4, an image 400 illustrates a first component 402A provided by a first robotic arm 404A and a second component 402B provide by a second robotic arm 404B. Image data related to the first component 402A and the second component 402B are provided in relation to a vision system coordinate system 406. However, the robotic assembly system operates within its own coordinate system (i.e., the robotic coordinate system), and thus, the position control module 142 converts the image 400 to a robotic coordinate system 408 using known techniques (e.g., series of linear equations, among other techniques).

With continued reference to FIG. 3, using known image pattern techniques, the position control module 142 identifies one or more assembly features at the components and determines the position of the designated assembly features in the robotic coordinate system. For example, with reference to FIG. 1, the assembly features employed for locating the components includes the interface points 14A-1 to 14-4 of the rail 12A and the interface points and 14B-1 to 14B-4 of the node 12B.

With the current positions of the components and more particularly, the assembly features, the position control module 142 controls the robotic assembly system to orient the components to nominal positions. Specifically, using the component location model 130, the position control module 142 is configured to calculate a positional offset to orient the first component and the second component to respective nominal positions. In one form, the component location model 130 is provided as a trained neural network model configured to use the current positions of the components and more specifically, the position of the assembly features, as inputs to determine the nominal positions of the components for assembling the components. Based on the nominal positions, the component location model 130 further calculates the positional offset of the components and provides desired robotic arm positions for the robotic arms 110 for placing the components at respective nominal positions. With the desired robotic arm positions, the position control module 142 instructs the robotic assembly controller 134 to operate the robotic arms 110 to locate the components at respective nominal positions.

Once at the nominal position, the assembly control module 144 is configured to assemble the components based on force feedback from the force sensors. In one form, the assembly control module 144 is configured to have the robotic assembly controller 134 move the robotic arms to engage the components. As the components engage, the assembly control module 144 determines if the force feedback from the force sensors is above a force setpoint (i.e., a defined setpoint), where the force setpoint is indicative of too much or an excessive amount of force for assembling the components. If so, the assembly control module 144 commands the robotic assembly controller 134 to end assembly of the components. For example, the robotic arms 110 stop pushing the components together and may place the components in a designated area for further review. In one form, the assembly control module 144 is configured to monitor the force feedback to adjust position of the components via the end-effectors 112 in the event the components are slightly misaligned.

In some variations, the assembly control module 144 further assembles the components based on one or more designated assembly features that may be the same and/or different from the designated assembly features used for retrieving and/or determining position of the components. For example, referring to FIGS. 1A-1C, the designated assembly feature includes the opening 14A-5 of the rail 12A and the opening 14B-5 of the node 12B. Using images from the imaging devices 104, the assembly control module 144 identifies the opening 14A-5 and 14B-5 and determines if a distance between the openings is within a distance threshold. If so, the components are engaged. If not, the robot assembly system 102 continues to engage the components in accordance with the force feedback.

Once engaged, the component joining module 146 is configured to operate the robotic joining system 136 to fixedly secure the first component and the second component via the robotic joining controller 136. In one form, the component joining module 146 issues a command to the robotic joining controller 136 to execute the securing process to have the robotic joining system 120 fixedly secure the components together. In some variations, the component joining module 146 controls position of the first component and the second component via the robotic assembly system 102. For example, the robotic assembly system 102 works in conjunction with the robotic joining system 120 during the securing process to fixedly secure the components.

It should be readily understood that the control system 106 can be configured in various suitable ways for performing the functions described with regard to the assembly process controller 132, the robotic assembly controller 134, and the robotic joining controller 136. For example, certain operations of the assembly control module 144, such as monitoring the force feedback, may be performed by the robotic assembly controller 134. In another example, in the event the joining operation is performed outside of the fixtureless assembly system 100, the control system 106 may not have the component joining module 146 or the robotic joining controller 136

Referring to FIG. 5, an example assembly routine 500 performed by the fixture assembly system of the present disclosure is provided. At 502, the fixture assembly system has the robotic assembly system retrieve the first component and second component. At 504, the fixture assembly system capture images of one or more assembly frames in which the robotic assembly system positions the retrieved first and second components. At 506, the fixture assembly system identifies assembly features of the first and second components based on captured images, and at 508, operates robotic assembly system to orient the first and second components to respective nominal positions based on the captured images and the component location model. At 510, the fixture assembly system operates the robotic assembly system to assemble the first component to the second component based on force feedback.

It should be readily understood that the routine 500 is an example routine and that other routines may be provided. For example, the routine may verify the assembly of the components based on one or more of the assembly features. That is, based on the images from the vision system, the control system is configured to identify designated assembly features and determine if the components are assembled. (e.g., distance between designated assembly features, position/orientation of a designated assembly feature, among other assembly feature characteristics).

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

In this application, the term "controller" and/or "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components (e.g., op amp circuit integrator as part of the heat flux data module) that provide the described functionality; or a combination of some or all of the above, such as in a system-on-chip.

The term memory is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A system for assembling a vehicle platform, the system comprising:
   a robotic assembly system including at least two robotic arms operable to locate components of the vehicle platform, wherein:
      each of the at least two robotic arms includes an end-effector and a force sensor configured to provide force feedback, and
      the at least two robotic arms includes a first robotic arm configured to locate a first component and a second robotic arm configured to locate the second component, wherein the components of the vehicle platform include the first component and the second component;
   a vision system including one or more multidimensional imaging devices configured to capture images of one or more assembly frames at which the components of the vehicle platform are to be located; and
   a control system configured to control the robotic assembly system to assemble the vehicle platform based on the images from the vision system, the force feedback from the at least two robotic arms, and a component location model:
   the control system includes a processor and a nontransitory computer-readable medium storing instructions that are executable by the processor, and the instructions include:
- identifying one or more assembly features of the first component and the second component from the images from the vision system;
- operating the first robotic arm and the second robotic arm to orient the first component and the second component to respective nominal positions, respectively, based on the images from the vision system and the component location model, wherein the component location model is configured to determine a positional offset for each of the first component and the second component, wherein the positional offset is employed to move the first component and the second component to the respective nominal positions; and
- operating the first robotic arm and the second robotic arm to assemble the first component to the second component based on the force feedback.

2. The system of claim 1, wherein the component location model is a trained model configured to provide desired robotic arm positions for the first robotic arm and the second robotic arm based on current positions of the components.

3. The system of claim 1, wherein, to assemble the first component to the second component, the instructions of the control system further include:
- determining whether the force feedback from the force sensors is above a defined setpoint; and
- instructing the robotic assembly system to end assembly of the first component and the second component in response to the force feedback being above the defined setpoint.

4. The system of claim 1, wherein at least one of the one or more multidimensional imaging devices of the vision system is secured to the robotic assembly system.

5. The system of claim 1, wherein at least one of the one or more multidimensional imaging devices of the vision system is external to the robotic assembly system.

6. The system of claim 1, wherein to orient the first component and the second component to the respective nominal positions, the instructions of the control system further include:
- determining current positions of the first component and the second component based on the assembly features identified in the images;
- calculating, by the component location model, the positional offsets for the first component and the second component based on the current positions and the nominal positions; and
- operating the first robotic arm and the second robotic arm based on the positional offsets to provide the first component and the second component at respective nominal position.

7. The system of claim 1, wherein:
- the one or more imagining devices are configured to associate the images of the one or more assembly frames to a vision system coordinate system, and
- the instructions of the control system further includes converting the images of the one or more assembly frames from the vision system coordinate system to a robotic coordinate system associated with the robotic assembly system.

8. The system of claim 1 further comprising:
- a robotic joining system configured to fixedly secure the first component to the second component as part of a securing process, wherein the instructions of the control system further include operating the robotic joining system to fixedly secure the first component and the second component that are assembled.

9. The system of claim 8, wherein the robotic joining system includes one or more end-effector tools configured to fixedly secure the first component to the second component via welding, adhesive bonding, mechanical fastening or a combination thereof.

10. The system of claim 8, wherein the robotic assembly system is configured to control position of the first component and the second component during the securing process by the robotic joining system.

11. A method of assembling a vehicle platform, the method comprising:
- locating, by a robotic assembly system, a first component and a second component of the vehicle platform, wherein the robotic assembly system includes at least two robotic arms, each of the at least two robotic arms includes an end-effector and a force sensor configured to provide force feedback, and the at least two robotic arms includes a first robotic arm configured to locate the first component and a second robotic arm configured to locate the second component;
- capturing, by a vision system, images of one or more assembly frames at which the first component and the second component of the vehicle platform are to be located, wherein the vision system includes one or more multidimensional imaging devices;
- identifying, by a control system, one or more assembly features of the first component and the second component from the images from the vision system;
- operating, by the control system, the first robotic arm and the second robotic arm to orient the first component and the second component to respective nominal positions based on the images from the vision system and a component location model, wherein the component location model is configured to determine a positional offset for each of the first component and the second component, wherein the positional offsets are employed to move the first component and the second component to the respective nominal positions; and
- operating, by the control system, the first robotic arm and the second robotic arm to assemble the first component to the second component based on the force feedback from the force sensors.

12. The method of claim 11, wherein the component location model is a trained model configured to provide desired robotic arm positions for the first robotic arm and the second robotic arm based on current positions of the first component and the second component, respectively.

13. The method of claim 11 further comprising, to assemble the first component to the second component:
- determining, by the control system, whether the force feedback is above a defined setpoint; and
- instructing, by the control system, the robotic assembly system to end assembly of the first component to the second component in response to the force feedback being above the defined setpoint.

14. The method of claim 11 further comprising, to orient the first component and the second component to the respective nominal positions:
- determining, by the control system, current positions of the first component and the second component based on the assembly features identified from the images;
- calculating, by the control system via the component location model, the positional offsets for the first component and the second component based on the current positions and the nominal positions; and operating, by the control system, the first robotic arm and the second robotic arm based on the positional offsets to provide the first component and the second component at respective nominal position.

15. The method of claim 11 further comprising:

associating, by the vision system, the images of the one or more assembly frames to a vision system coordinate system; and converting, by the control system, the images of the one or more assembly frames from the vision system coordinate system to a robotic coordinate system associated with the robotic assembly system.

16. The method of claim 11 further comprising operating, by the control system, a robotic joining system to fixedly secure the first component and the second component that are assembled during a securing process.

17. The method of claim 16, wherein the robotic joining system includes one or more end-effector tools configured to fixedly secure the first component to the second component via welding, adhesive bonding, mechanical fastening or a combination thereof.

18. The method of claim 16 further comprising controlling, by the robotic assembly system, position of the first component and the second component during the securing process by the robotic joining system.

19. A system for assembling a vehicle platform, the system comprising:
- a robotic assembly system including at least two robotic arms operable to locate components of the vehicle platform, wherein:
  - each of the at least two robotic arms includes an end-effector and a force sensor configured to provide force feedback, and
  - the at least two robotic arms includes a first robotic arm configured to locate a first component and a second robotic arm configured to locate the second component, wherein the components of the vehicle platform include the first component and the second component;
- a vision system including one or more multidimensional imaging devices configured to capture images of one or more assembly frames at which the components of the vehicle platform are to be located; and
- a control system configured to control the robotic assembly system to assemble the vehicle platform based on the images from the vision system, the force feedback from the at least two robotic arms, and a component location model:

the control system includes a processor and a nontransitory computer-readable medium storing instructions that are executable by the processor, and the instructions include:
- identifying the assembly features of the first component and the second component from the images from the vision system;
- determining current positions of the first component and the second component based on the assembly features identified;
- calculating, by the component location model, positional offsets for the first component and the second component based on the current positions and nominal positions for the first component and the second component;
- operating the first robotic arm and the second robotic arm based on the positional offsets to provide the first component and the second component at respective nominal position;
- operating the first robotic arm and the second robotic arm to assemble the first component to the second component based on the force feedback;
- determining whether the force feedback from the force sensors is above a defined setpoint; and
- instructing the robotic assembly system to end assembly of the first component and the second component in response to the force feedback being above the defined setpoint.

20. The system of claim 19 further comprising:

a robotic joining system configured to fixedly secure the first component to the second component as part of a securing process, wherein the instructions of the control system further include operating the robotic joining system to fixedly secure the first component to the second component that are assembled.

* * * * *